United States Patent [19]

Elberbaum

[11] Patent Number: 5,335,014
[45] Date of Patent: Aug. 2, 1994

[54] METHOD AND APPARATUS FOR REMOTE SYNCHRONOUS SWITCHING OF VIDEO TRANSMITTERS

[75] Inventor: David Elberbaum, Tokyo, Japan
[73] Assignee: Elbex Video, Ltd., Tokyo, Japan
[21] Appl. No.: 950,918
[22] Filed: Sep. 24, 1992
[51] Int. Cl.⁵ .............................................. H04N 7/18
[52] U.S. Cl. .................................... 348/159; 348/211
[58] Field of Search ................. 358/181, 108, 142, 12, 358/149, 210, 86; H04N 7/18

[56] References Cited

U.S. PATENT DOCUMENTS

| | | | |
|---|---|---|---|
| 3,752,907 | 8/1973 | Mazza | 358/210 |
| 4,183,044 | 1/1980 | Breithaupt | 358/210 |
| 4,298,889 | 11/1981 | Burianek | 358/149 |
| 4,326,221 | 4/1982 | Mallos | 358/210 |
| 4,511,886 | 4/1985 | Rodriquez | 358/108 |
| 4,603,352 | 7/1986 | Kaneta | 358/148 |
| 4,943,864 | 7/1990 | Elberbaum | 358/108 |
| 4,949,178 | 8/1990 | Hovens | 358/149 |
| 4,989,085 | 1/1991 | Elberbaum | 358/210 |
| 4,994,916 | 2/1991 | Pshtissky | 358/181 |

FOREIGN PATENT DOCUMENTS 0109198 4/1990 Japan ................................. 358/108
0192985 8/1991 Japan ................................. H04N 7/18

Primary Examiner—James J. Groody
Assistant Examiner—Chris Grant
Attorney, Agent, or Firm—Helfgott & Karas

[57] ABSTRACT

A method and apparatus for synchronous switching of a plurality of transmitters each including a television camera for generating composite video signals and each incorporating an individually allotted identification code, in which at least one transmission line receives and transmits information to and from the plurality of the transmitters. A receiver incorporates an external synchronizing signal generator and an identification code generator for receiving and displaying the images on the monitor, for synchronizing a plurality of the transmitters and for transmitting identification codes superposed into the composite video signal generated by the transmitter by injecting the external synchronizing pulses and the identification code into the video transmission line. The receiver also comprises a circuit for modifying the external synchronizing pulses to switch the transmission on or off from an individual transmitter on the basis of the transmitted identification code signal and the modified external synchronizing signal.

28 Claims, 9 Drawing Sheets

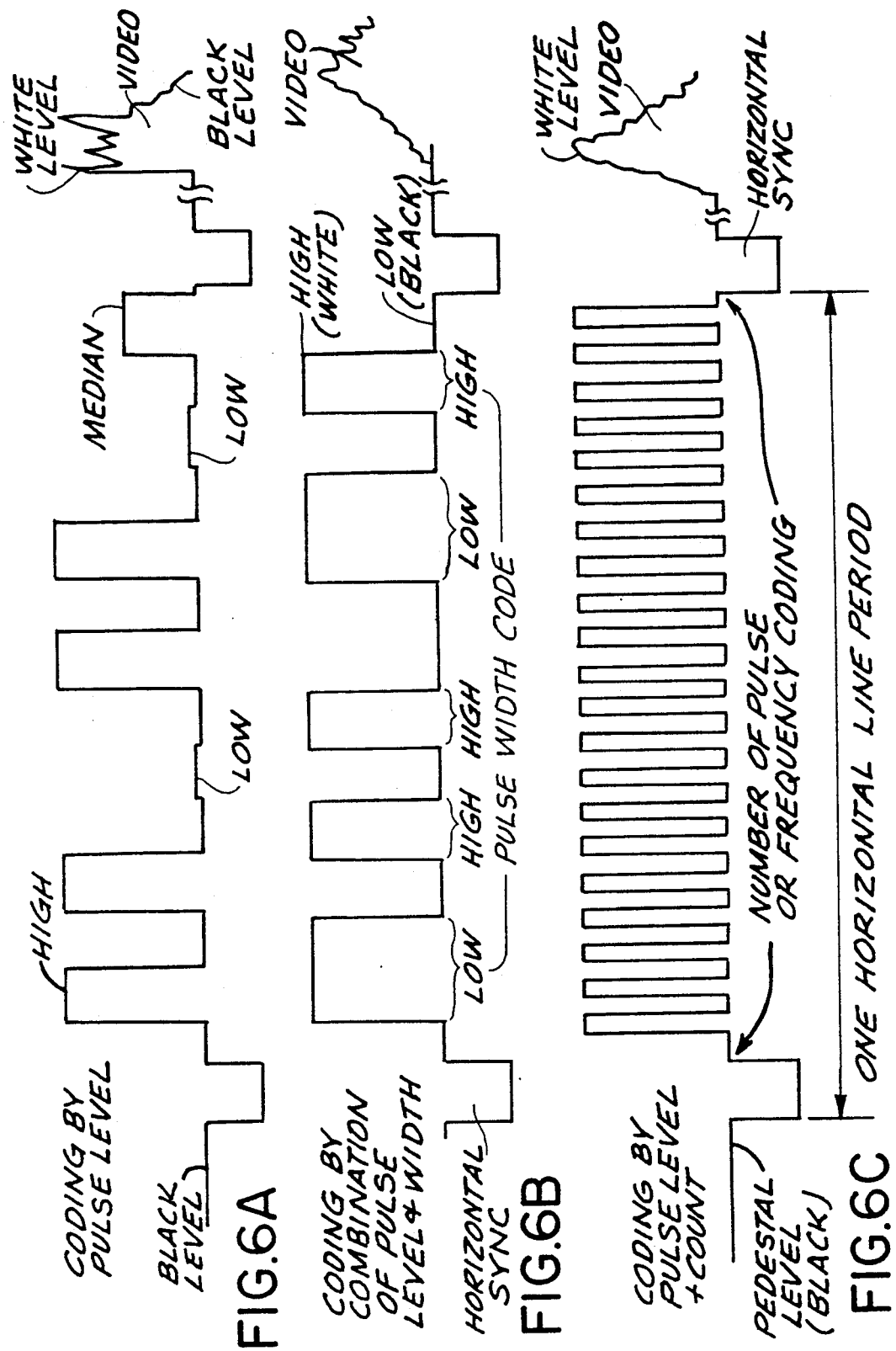

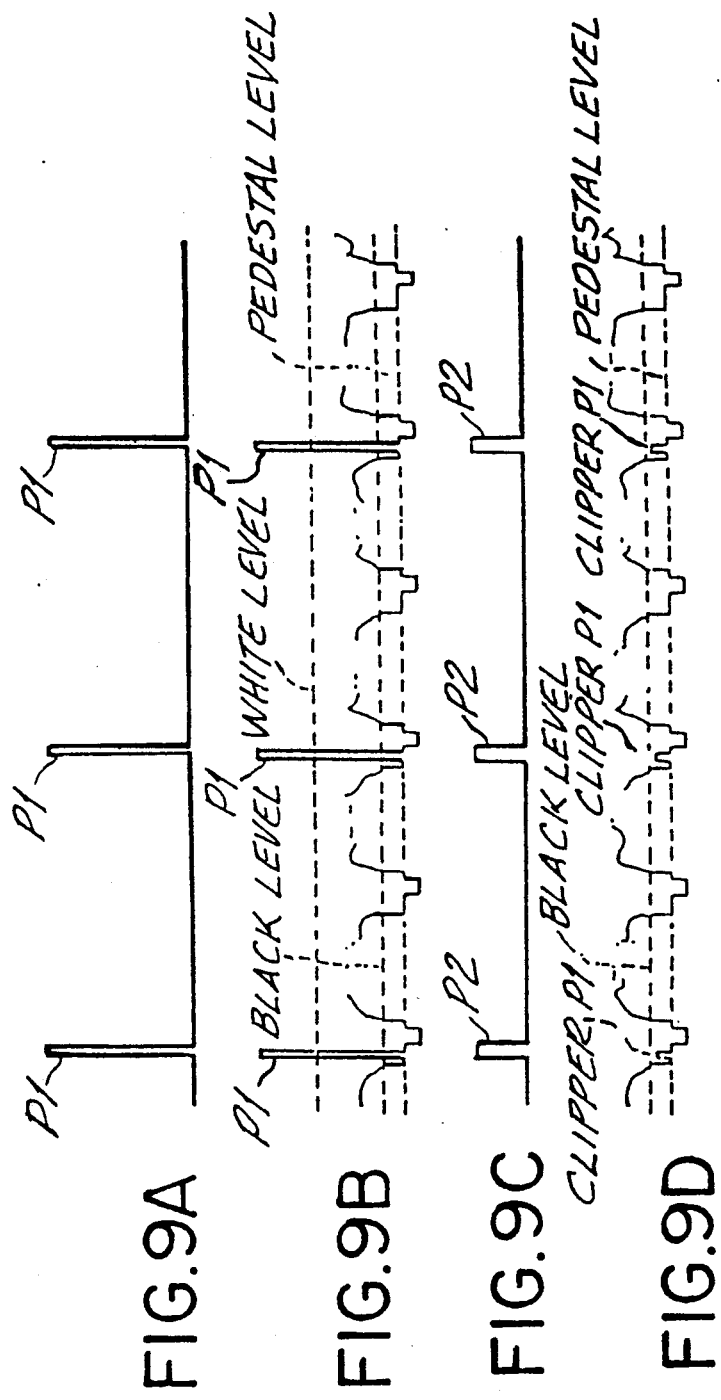

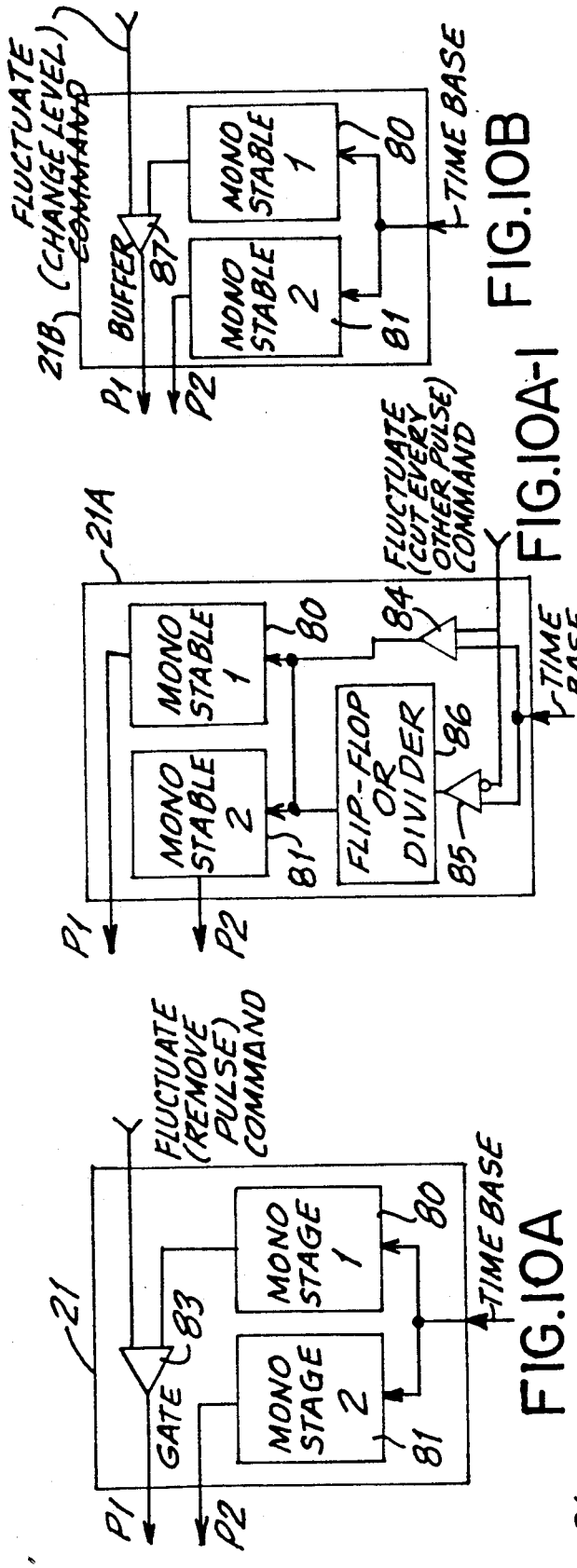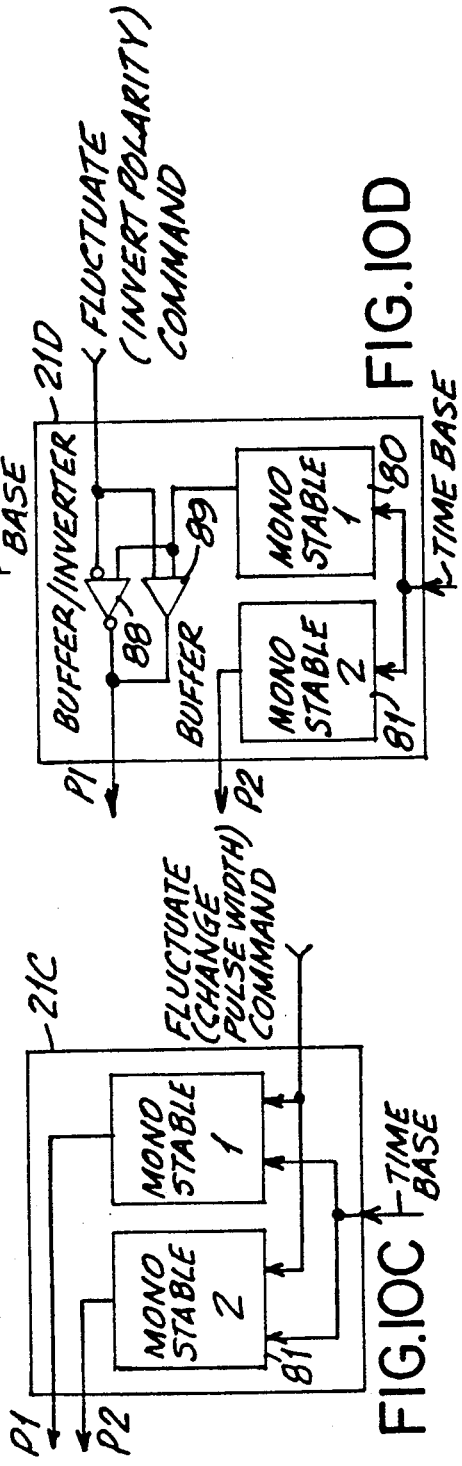

METHOD AND APPARATUS FOR REMOTE SYNCHRONOUS SWITCHING OF VIDEO TRANSMITTERS

BACKGROUND OF THE INVENTION

1. Field of the Invention

This invention relates to an apparatus for selecting and synchronous switching of television cameras used in close circuit television for a monitoring system.

2. Description of the Prior Art

In a monitoring television system used as one of information transmission systems, at least one television monitor is connected through an electronic switch to a plurality of television cameras and a plurality of transmission lines. Picture images picked up by one of a number of TV cameras are displayed on the TV monitor by switching operations carried out by the electronic switch. The electronic switch provides selection of any individual television camera or sequentially switches a plurality of the television cameras for displaying a picture image of one camera after another on the television monitor or for recording into a video recorder.

In such an information transmission system it is preferable to mutually lock the internal synchronizing signals of a plurality of television cameras and the switching time to an external synchronizing signal, in order to prevent the picture image on the monitor from being disturbed during and immediately after the switching operation from one television camera to another.

As devices for synchronizing a plurality of television cameras, there are known apparatuses for transmitting a vertical synchronizing signal, or a vertical synchronizing signal and a horizontal synchronizing signal, or a composite synchronizing signal used in a television system.

In any of the known devices of the type under discussion, as the transmitted synchronizing signal itself is a train of pulses, which can be easily influenced by noise, the transmission of a synchronizing signal requires the use of coaxial cables with their high shielding effect, which makes it costly for the systems with a plurality of television cameras.

Another known apparatus for synchronizing a plurality of television cameras, is an apparatus for transmitting an external synchronizing signal from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352, the contents of which are incorporated herein by reference.

Furthermore, in such an information transmission system, the selector is disposed at the monitor site connected to a plurality of coaxial cables or other transmission lines such as twisted pair, or fiber optics for the transmission of the composite video signals. If a large number of cameras are used in such a system and the cameras are spread into distant locations, the need for a plurality of long stretched coaxial cables or other transmission lines makes such a system laborious and costly.

SUMMARY OF THE INVENTION

It is an object of the present invention to provide a method and an apparatus for synchronously switching a plurality of television cameras with a connection through a single transmission line and remotely selecting any individual camera in a synchronized switching operation, without disturbing a displayed image on the TV monitor during and immediately after the switching operation from one television camera to another.

According to the present invention an external synchronizing signal injected into the transmission line leading from the receiver to the transmitters or TV cameras is modified in the receiver so as to produce a fluctuated external synchronizing signal.

The term "fluctuated external synchronizing signal" used throughout the application means a broader term for changing a synchronizing signal identity that includes changing of an amplitude or level of the synchronizing pulse and/or its width and/or its polarity and/or removal of one or a number of pulses from the pulse train, thereby altering or fluctuating the external synchronizing signal which is recognized by those transmitters or TV cameras which are to be switched.

The above and other objects of the invention are attained by a method for remote synchronous switching of a plurality of transmitters each incorporating an individually allotted identification code, which method comprises the steps of generating and transmitting an individual composite video signal from said plurality of transmitters through a transmission line to a receiving means receiving and displaying said individual composite video signal on a monitor, transmitting an external synchronizing signal from said receiver to said transmitters through said transmission line along with an identification code signal commensurate with any of the individually allotted identification code, wherein the external synchronizing signal is modified in said receiver before said transmitting step to produce a fluctuated external synchronizing signal, switching any of said transmitters on to transmit said composite video signal to said receiver through said transmission line whenever said identification code signal is commensurate with a respective individually allotted identification code incorporated in a respective transmitter and when said external synchronizing signal has been modified.

The objects of the present invention are attained by a synchronous switching apparatus for a television system which comprises a plurality of transmitters for transmitting a composite video signal, each transmitter incorporating an individually allotted identification code; a receiver for receiving said composite video signal; and at least one transmission line for transmitting and receiving information between said transmitters and said receiver, said receiver including a circuit for generating an identification code signal commensurate with any of said individually allotted identification code, a circuit for generating an external synchronizing signal, a circuit for transmitting said external synchronizing signal and said identification code signal to said transmitters through said transmission line, and means for modifying the external synchronizing signal for producing a fluctuated external synchronizing signal, each of said transmitters including a decoder means to decode said identification code signal, identification code comparison means to compare a decoded identification code signal with said individually allotted identification code and outputting a match signal or a mismatch signal, a sensor circuit for detecting a fluctuated external synchronization signal and outputting a fluctuated signal, and a controller for switching on a composite video signal transmission whenever said match signal and said fluctuated signal coincide or switch off the video signal transmission whenever said mismatch signal and said fluctuated signal coincide.

In the preferred embodiment of the present invention, the injector circuit may include a mixer circuit wherein the code signals are mixed and injected into the composite video signal. Such a mixer circuit is disclosed in U.S. Pat. No. 4,989,085, the contents of which are incorporated herein by reference.

The external synchronizing generator may include a circuit for generating external synchronizing pulse signals having a level higher than the white level or lower than the black level of the composite video signal generated by the transmitters, injecting the synchronizing pulse into the video transmission lines connected to the transmitters, and synchronizing the internal synchronizing generators of the transmitters on the basis of the injected synchronizing pulses.

The transmitters preferably each includes a circuit for extracting the identification code signal from the composite video signal and outputting the extracted identification code signal to the decoder circuit for decoding the identification code signal, and a level comparator circuit for separating the external synchronizing pulse signals from the composite video signal on the basis of a level difference and applying the separated external synchronizing pulses to the transmitters.

According to the present invention, as the transmitters are synchronized by a pulse signal propagated through the video transmission line and switched on and off by a modified or fluctuated external synchronizing signal, and as the identification code is injected into the composite video signal from the receiver by the use of the same video transmission line, costs for synchronously switching a plurality of television cameras are substantially reduced.

The foregoing and other objects and features of the invention will become apparent from the following description of preferred embodiments of the invention with reference to the accompanying drawings.

BRIEF DESCRIPTION OF THE DRAWINGS

FIGS. 6A-6C diagrammatically show electric waveforms of identifications code signals;

FIGS. 9A-9D show electric waveforms of external synchronizing signals; and

FIGS. 10A, 10A-1 and 10B through 10D are block diagrams showing embodiments of the pulse shaping and timing circuit of the synchronous switching apparatus of the present invention.

DETAILED DESCRIPTION OF THE PREFERRED EMBODIMENTS

Figure 1:
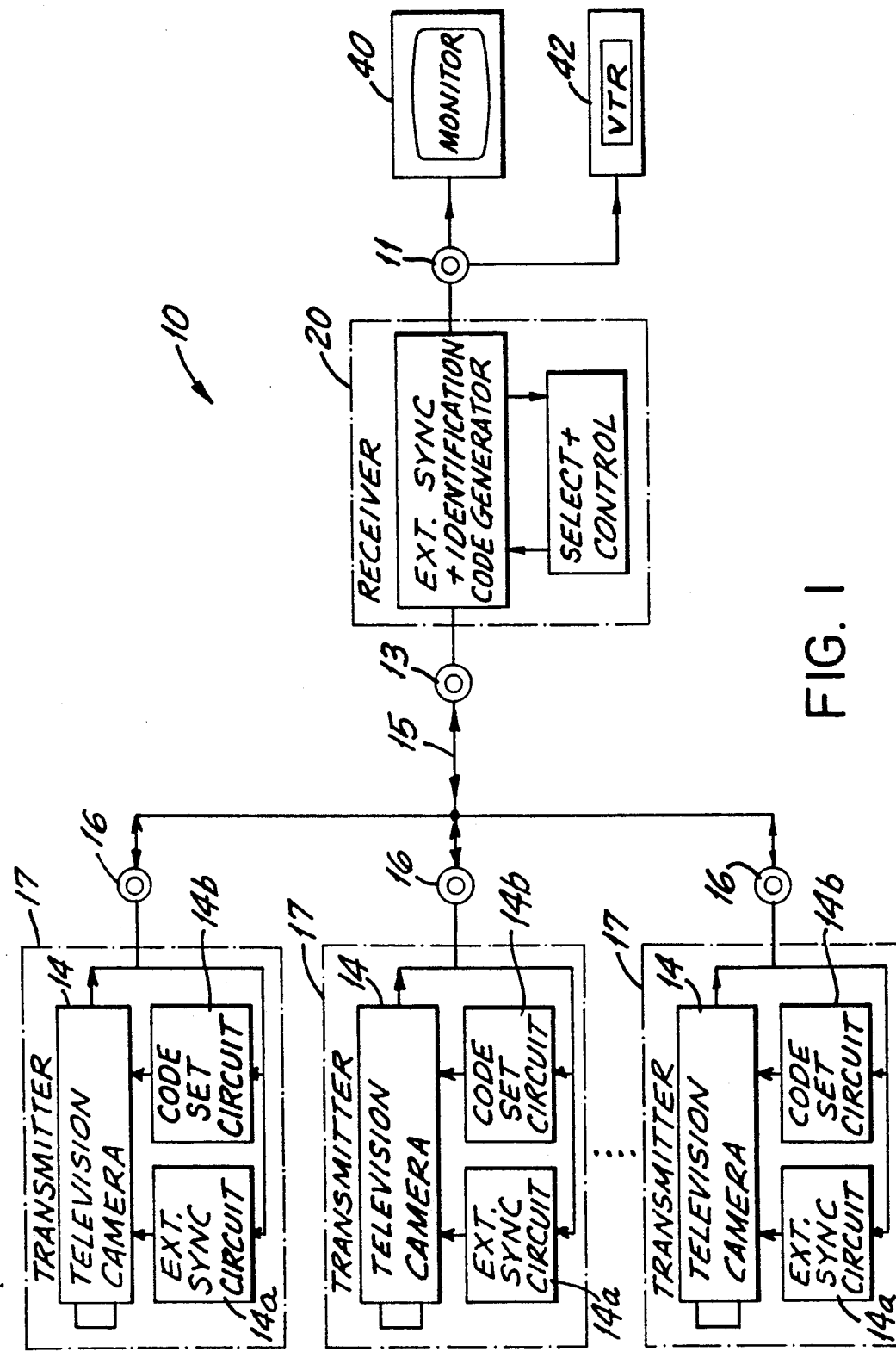
FIG. 1 is a block diagram showing an electric circuit of a synchronous switching apparatus according to a preferred embodiment of the present invention.

Referring to FIG. 1, an apparatus for synchronous switching of the present invention 10 includes a plurality of transmitters 17 incorporating television cameras 14 synchronized by an external synchronizing signal and generating a composite video signal corresponding to the images picked-up by the television cameras in a manner disclosed in the afore-mentioned U.S. Pat. No. 4,603,352, the respective part of the disclosure of which is incorporated herein by reference. Each transmitter 17 further includes a synchronizing circuit 14a and a code set circuit 14b in a conventional fashion and incorporates an individually allotted identification code.

A receiver 20 is connected to transmitters 17 via a video transmission line 15 for receiving and outputting composite video signals to a TV monitor 40 and to a video recorder VTR 42 and for switching the received composite video signal from one transmitter 17 to another.

The frequency of the external synchronizing signal commensurate with the frequency of the vertical scanning frequency of the video signal is outputted from the transmitter 17. The frequency of the external synchronizing signal may be either of a frame scanning frequency or a field scanning frequency. For example, in case of NTSC system the vertical synchronizing signal frequency is 60 Hz; therefore, the field frequency is 60 Hz and the frame frequency is 30 Hz.

Figure 3:
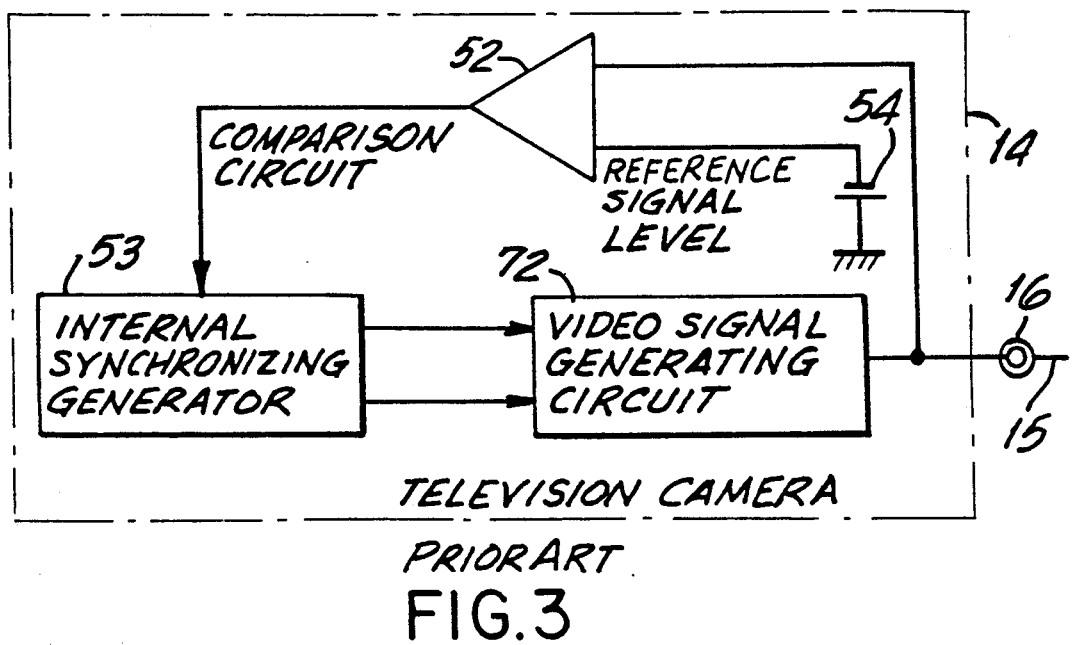
FIG. 3 is block diagram showing an electric circuit of a television camera operated with a known frame-or-field-externally synchronizing method.

As shown in FIG. 3, the television camera 14 is a well-known television camera synchronized by a synchronizing pulse having a level higher than the white level of a composite video signal, as described in the aforementioned U.S. Pat. No. 4,608,352.

Figure 2:
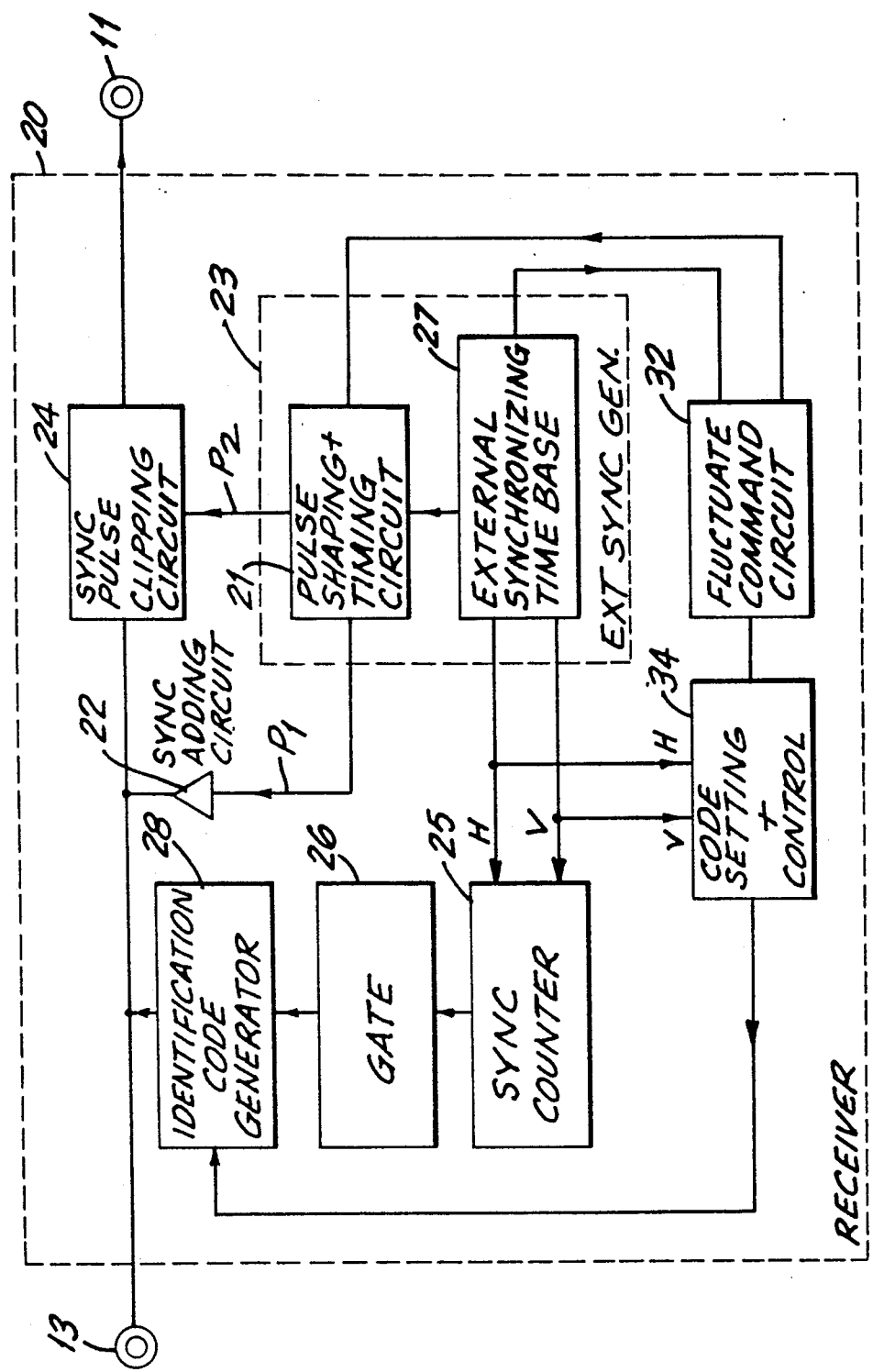
FIG. 2 is a block diagram showing an electric circuit of a television receiver with a frame or field external synchronizing generator and an identification code generator according to a preferred embodiment of the present invention.

Each television camera 14 (FIG. 3) comprises a comparison circuit 52 for comparing the voltage level of the vertical frame or field synchronizing pulse fed from an external synchronizing signal generator 23 of the receiver 20 shown in FIG. 2 through the video transmission line 15 to a reference voltage source 54, and generating a pulse signal when a frame or a field synchronizing pulse is equal or higher than the reference voltage of reference voltage source 54. The TV camera further includes an internal synchronizing signal generator 53 for receiving a pulse signal outputted from the comparison circuit 52 and generating an internal synchronizing signal synchronized with the received pulse signal, and a video signal generating circuit 72 for generating a video signal.

One input terminal of the comparison circuit 52 is connected to the video transmission line 15 through terminal 16, and the other input terminal of the comparison circuit 52 is connected to the reference voltage source 54. The reference voltage of the reference voltage source 54 has a level higher than the white level of the composite video signal, preferably a level approximately equal to the frame of field synchronizing pulse level.

The internal synchronizing signal generator 53 generates horizontal and vertical synchronizing signals on the basis of the pulse signal outputted from the comparison circuit 52. The composite video signal corresponding to the observed image is outputted from the video signal generating circuit 72 and is fed to the video transmission line 15, through terminal 16.

Referring to FIG. 2, receiver 20 includes a synchronizing pulse adding circuit 22 connected to an external synchronizing generator 23 and injecting the external synchronizing signal into the video transmission lines 15 for transmitting the external synchronizing signal to the television cameras 14, and a synchronizing pulse clipping circuit 24 for clipping and removing external synchronizing pulses from a receiver output 11.

As further shown in FIG. 2, the synchronizing pulse adding circuit 22 injects the frame or field external synchronization pulse into the video transmission line 15 through the receiver input terminal 13 connected also to an identification code generator 28. However, depending on the synchronizing method and location of the synchronizing generator the synchronizing pulse adding circuit 22 may be connected to other junctions along the video transmission lines for injecting the frame or field external synchronizing pulses.

Since the internal synchronizing signal generator 53 of each TV camera 14 is synchronized with the injected external frame or field synchronizing pulse, the frame synchronizing pulse is present in the video transmission line 15 within the period corresponding to the vertical blanking interval in the composite video signal. In this step, the external frame or field synchronizing pulse is transmitted by the use of the transmission line for the video signal without affecting the video signal transmitted from the television camera.

However, in order to avoid a signal level input error it is preferable to remove signal levels that are larger than the white level of the video composite signal from the composite video signal reaching the inputs of the monitor 40 or the video recorder 42.

The external synchronizing generator 23 shown in FIG. 2 comprises a synchronizing pulse shaping and timing circuit 21 for forming and generating two pulse signals P1 and P2 corresponding to a predetermined rate, width and level, as shown in FIGS. 9(A) and 9 (C), respectively and is connected to the synchronizing pulse clipping circuit 24.

The phases of the pulse signals P1 and P2 correspond to the vertical blanking interval of the composite video signal, as shown in FIG. 9(B). At the same time, the pulse signals P1 and P2 shown have a frame rate, i.e. they are generated every second vertical field synchronizing signals. The frame synchronizing pulse signal P1 has a level higher than the white level of the composite video signal, as shown in FIG. 9(B).

Referring again to FIG. 2, it will be seen that the input of the synchronizing pulse adding circuit 22 is fed with pulse P1 outputted from the output terminal of the synchronizing pulse shaping and timing circuit 21 of the external synchronizing generator 23, and the output terminals of the synchronizing pulse adding circuit 22 are connected to the input terminal 13 of the receiver 20 for receiving the composite video signal fed from the transmitters 17 through the video transmission line 15 and for injecting the frame synchronizing pulse P1 into the video transmission line. Therefore a composite video signal is modified into a signal shown in FIG. 9(B), into which the pulse signal P1 is injected within the period corresponding to the vertical blanking interval.

The input of the synchronizing pulse clipping circuit 24 is fed with pulse P2 outputted from the synchronizing pulse shaping and timing circuit 21 for clipping a portion of the signal, which corresponds to the pulse signal P1 in the composite video signal circuit fed to the input of the synchronizing pulse clipping circuit 24, to below the black level of the composite video signal as shown in FIG. 9(D). Therefore, pulse P1 is removed from the video signal fed to the monitor 40 or VTR 42 through the synchronizing pulse clipping circuit 24 and is not outputted at the output terminal 11, and thus will not influence the image displayed on the monitor 40 or the video recorder 42.

Therefore, even if any pulse signal P1 is included in the video signal fed to the synchronizing pulse clipping circuit 24, the pulse signal P1 is essentially removed by the synchronizing pulse clipping circuit 24 so that the video signal outputted from the synchronizing pulse clipping circuit 24 does not include pulse signal P1.

The synchronizing pulse adding circuit 22 may be an injection circuit, using well known technique of mixing signals by employing readily available ICs, or by employing a discrete circuit using transistors, resistors and diodes. The frame synchronizing pulses injected into the composite video signal fed from the television cameras 14 are thereby present at the input terminal of the receiver 20 and throughout the video transmission line 15. Therefore, the composite video signal injected with the frame synchronizing pulse P1 is fed to the comparison circuit 52 of the television camera 14 through the transmitter terminal 16.

Instead of using the synchronizing pulse adding circuit 22 and the synchronizing pulse clipping circuit 24, the frame synchronizing pulse signal P1 may be outputted directly to the comparison circuit 52 of the television camera 14.

In case the television camera 14 is not provided with the comparison circuit 52, the pulse signal P1 or P2 may be outputted to the internal synchronizing generator 53 of the television camera 14. In the latter case, the synchronizing pulse adding circuit 22 and the synchronizing pulse clipping circuit 24 can be omitted.

In case the television camera 14 is synchronized by the horizontal and vertical synchronizing signals, or by a composite synchronizing signal, or the horizontal and vertical drive signals, a circuit for generating the horizontal and vertical synchronizing signals or composite synchronizing signal, or the horizontal and vertical drive signals may be installed in the receiver 20 in place of the synchronizing pulse adding circuit 22 and the synchronizing pulse clipping circuit 24.

To cause fluctuation in the width of external synchronizing signals generated by the external synchronizing generator 23, the pulse timing and shaping circuit 21 may be formed as shown in FIG. 10C. The pulse timing and shaped circuit 21c comprises a monostable multivibrator circuit controlled by a fluctuation command signal generated by a fluctuation signal command circuit 32 for increasing or decreasing the width of the pulses P1 and P2.

The input of the pulse shaping and timing circuit 21 of the external synchronizing generator 23 is connected to the output of the fluctuation signal command circuit 32. The input of the fluctuation signal command circuit 32 is fed from a code setting and select control circuit 34 and, the fluctuation command signal is synchronized to time with the identification code generation to remove one or more pulses from the frame or field external synchronizing pulse train P1, for switching the composite video signals from one transmitter 17 to another.

The pulse shaping and timing circuit 21 may consist of a well known gate circuit 83 of FIG. 10A to remove one or more pulses from the pulse train P1 outputted to the synchronizing pulse adding circuit 22.

To remove every other pulse from the pulse train the pulse shaping and timing circuit 21A of FIG. 10A-1 may consist of well known flip-flop or divider circuit 86 controlled by well known gate circuits 84 and 85.

In the case of fluctuating the pulse level or amplitude, the input of the pulse shaping and timing circuit 21B of FIG. 10B connected to the output of fluctuation signal command circuit 32 may be a conventional control input of a pulse buffer 87, wherein the fluctuation command signal will increase or decrease the amplitude or level of the outputted pulse P1.

Referring to FIG. 2 the external synchronizing generator 23 further includes an external synchronizing time base 27 connected to the pulse shaping and timing circuit 21 and supplying signals to a counter 25.

The second input of the fluctuation signal command circuit 32 is also fed with a timing pulse generated by the external synchronizing time base 27 of the external synchronizing generator 23 for synchronizing the timing of the fluctuated command signal with the external synchronizing time base.

It should be noted that those parts of the television camera and the synchronizing signal generating circuit which are disclosed in the referenced patents have not been described herein in detail.

As further shown in FIG. 2, the identification code generator 28 is activated through a gate circuit 26 connected to the counter 25 for counting the number of the horizontal scanning lines. The adder input of counter 25 which is connected to the external synchronizing time base 27 of the external synchronizing generator 23 receives a horizontal synchronizing signal (H), generated by the external synchronizing signal generator 23 and the clear or reset input of the counter 25 receives the vertical synchronizing signal (V) also generated by the external synchronizing signal generator 23. The counter 25 counts the number of the horizontal scanning lines every field or frame of the vertical scanning period and the output of counter 25 is fed to the gate circuit 26.

The gate circuit 26 outputs a gate signal to the identification code signal generator 28 only when the count number in the counter 25 remains at a predetermined value, for a duration of at least one horizontal scanning line period. It is preferable that the predetermined value of the counter number is within the vertical blanking period. For example, in the NTSC system the first 21 horizontal scanning lines are within the vertical blanking period. Therefore it is preferable that the gate signal generated by the gate circuit 26 is outputted for any predetermined number of horizontal scanning lines within, for example, the 10th to the 20th horizontal scanning lines of one vertical scanning period.

The identification signal generator 28 is connected to the identification code setting and select control circuit 34 for setting the identification code. Thus the identification code generator 28 outputs a code signal corresponding to the identification code set in the code setting and select control circuit 34 to the video transmission line 15 when the gate signal is received and for the duration of the gate signal.

The identification code set in the code setting and select control circuit 34 is commensurate with the individually allotted code to each of the transmitters 17; such numbers as "1", "2", "3"... "n", can be used as camera identification codes, respectively.

Identification code signals are shown in FIG. 6 (A-C). The identification code signal is a binary code or a bar code signal having two or more levels, composed of a high level or white, which is the maximum or highest level of the picture signal in the video signals, a low level or black, which is the lowest level of the picture signal, and a median level or gray, which is the medium level of the picture signals in the video signal generated by the television cameras 14 as shown in FIG. 6A; the identification code may be a combination of pulse signal levels and varying pulse widths as shown in FIG. 6B.

Alternatively, the identification code signal may be either a sine-wave signal or a pulse signal having a frequency corresponding to the identification code, the sine-wave, or the pulse signal is generated during one or more horizontal scanning periods as shown in FIG. 6C, preferably, during the vertical blanking period.

The code signal generator 28 superposes the identification code signal onto the video signal outputted from the corresponding the television camera 14, thereby, the code signal superposed on the video composite signal is present in the video transmission line 15, connected to the input 16 of the respective transmitter 17.

Figure 4:
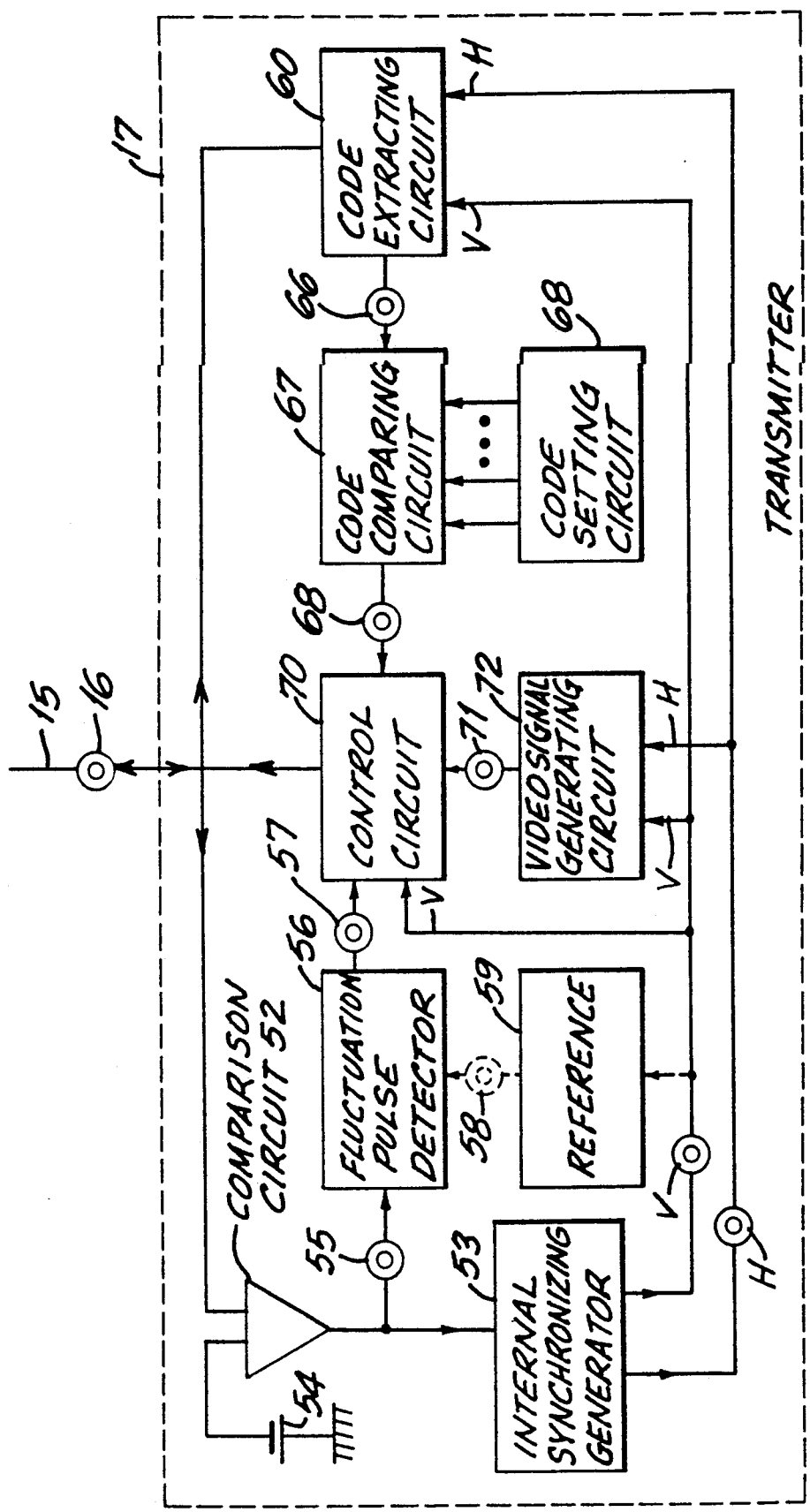
FIG. 4 is a block diagram showing an electric circuit of a television camera according to a preferred embodiment of the present invention.

In a preferred embodiment, transmitter 17 shown in FIG. 4 comprises a code extracting circuit 60 the input of which is connected to the video transmission line 15 through terminal 16 for extracting the superposed identification code signal from the composite video signal. The extracted identification code signal is fed via terminal 66 to an identification code comparing circuit 67. The identification code comparing circuit 67 is also fed with identification code from a code setting circuit 68, commensurate with the identification code allotted to the respective transmitter 17.

The identification code comparing circuit 67 generates either a match signal when the extracted identification code fed from the code extracting circuit 60 corresponds to the code fed from the code setting circuit 68, or a mismatch signal when the extracted identification code fed from the code extracting circuit 60 does not correspond to the code fed from the code setting circuit 68.

Figure 8:
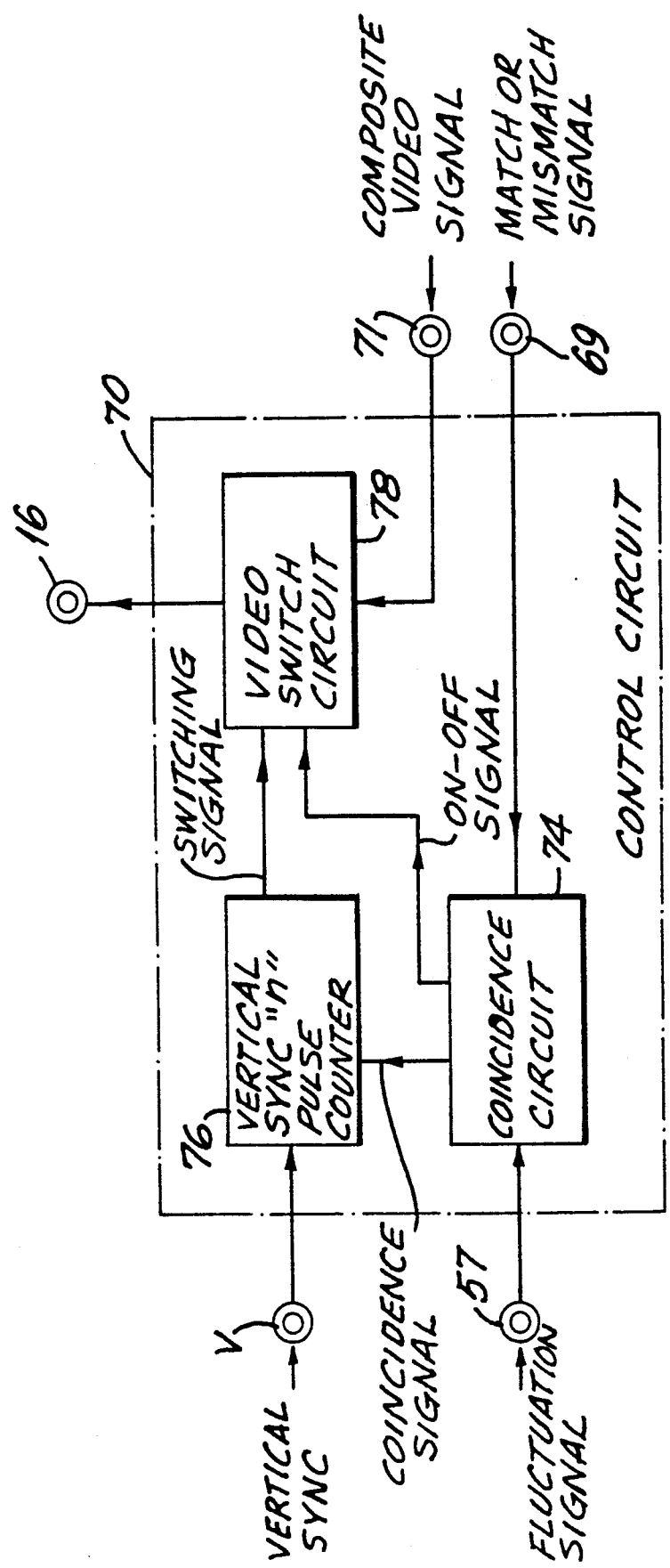
FIG. 8 is a block diagram showing an embodiment of an electric circuit using a synchronous switching method of the present invention.

The match or mismatch signal generated by the code comparing circuit 67 is fed to a control circuit 70 for switching on or off a video switch circuit 78, shown in detail in FIG. 8.

Figure 5:
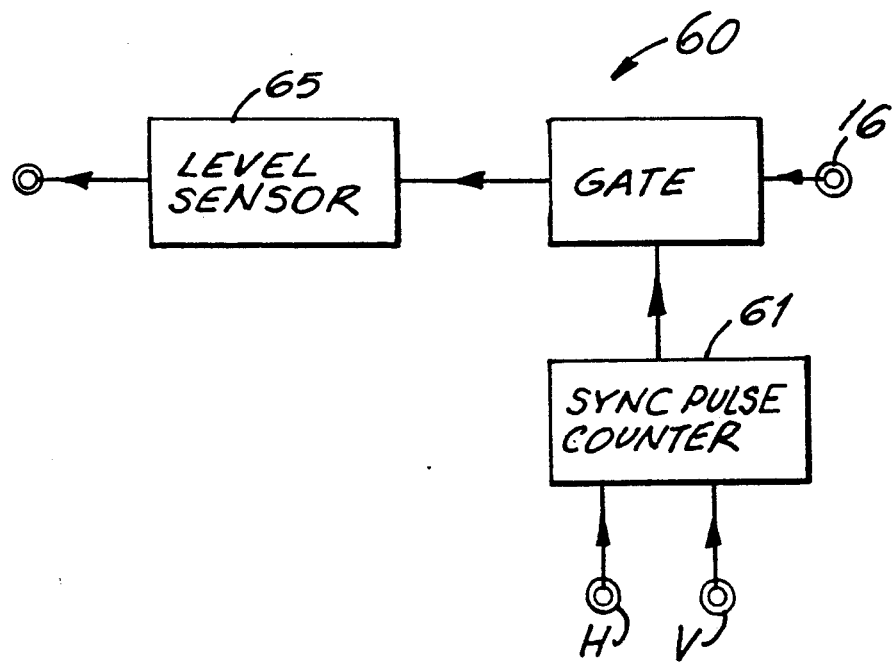
FIG. 5 is a block diagram showing an embodiment of the identification code extracting circuit of the present invention.

The extracting circuit 60 shown in detail in FIG. 5 includes a synchronizing pulse counter 61 for counting the number of horizontal synchronizing pulses during every field or frame of the composite video signal, a gate circuit 63 connected to the output of counter 61 for outputting the composite video signal fed from terminal 16 when the counted value of the counter 61 is a predetermined value, a level sensor 65 for sensing a signal level or for detecting the envelope of the signal outputted from the gate circuit 63 to reproduce the code signal and outputting the extracted code signal to the terminal 66.

Referring back to FIG. 4, the outputted extracted code signal is fed to the input of the code comparing circuit 67, which may consist of well known digital comparison circuits using readily available ICs or microprocessors.

The external synchronizing pulses outputted from the comparison circuit 52 of the television camera are also fed to a fluctuated pulse detector circuit 56 for detecting a fluctuated external synchronizing pulse signal generated by the external synchronizing generator 23 as explained above.

Figure 7B:
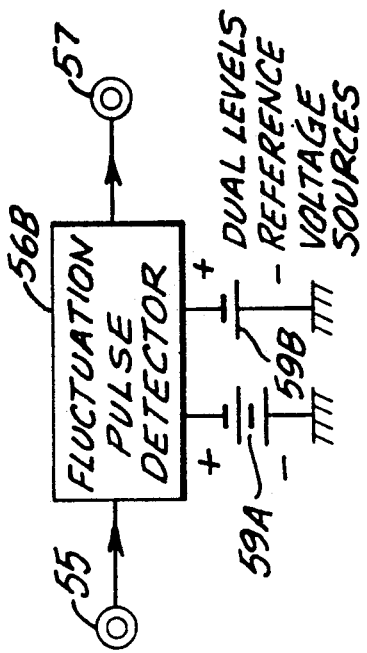
FIGS. 7A through 7D are block diagrams showing embodiments of the fluctuated pulse signal detecting circuit of the present invention.
Figure 7D:
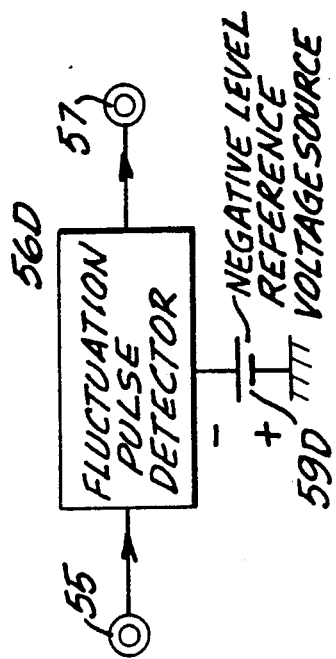
Figure 7A:
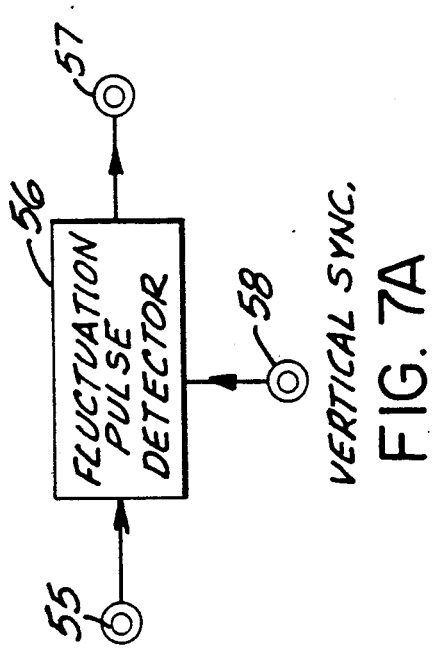

As further shown in FIG. 4 and also in FIG. 7A the fluctuated pulse detector 56 for detecting removed external synchronizing pulses is fed with a pulse signal outputted from the comparison circuit 52 through an input terminal 55. A reference input terminal 58 of the fluctuated pulse detector circuit 56 is connected to receive a vertical sync signal generated by the internal synchronizing generator 53 and outputs a fluctuated signal through its output terminal 57 to a control circuit 70. Since the two inputted pulse signals fed from the comparison circuit 52 and the internal synchronizing generator 53 are mutually locked, the fluctuating pulse detector 56 which may comprise a well known gate circuit compares the continuity of the pulse train at the terminal 57 and outputs a fluctuation signal whenever a pulse or several pulses are removed from the external synchronizing pulse train.

Referring to FIG. 7B, the fluctuated pulse detector 56B for detecting a decrease or increase in the pulse level or amplitude fed from the comparison circuit 52 of the TV camera through the input terminal 55, comprises a pulse level comparator having two reference voltage sources, higher level voltage reference source 59A and lower level voltage reference source 59B, and outputting a fluctuated signal through the output terminal 57 whenever the pulses fed through the input terminal 55 are lower than the lower reference voltage 59B, or higher than the higher reference voltage 59A.

Figure 7C:
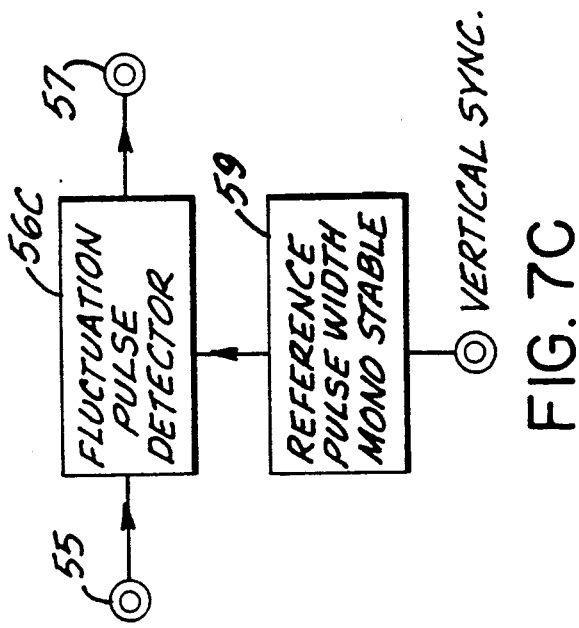

As explained above, the fluctuation in the external synchronizing signal generated by generator 23 can be obtained by changing the width of pulse P1. FIG. 7C shows a fluctuation pulse detector 56C which is constructed for detecting decrease or increase in the width of the pulse fed from the comparison circuit 52 through input terminal 55. The fluctuated pulse detector 56C is fed with a reference pulse from a reference pulse width shaper 59C. The reference pulse width shaper 59C is fed with vertical synchronizing pulses generated by the internal synchronizing generator 53, through input terminal 58. The reference pulse width shaper 59C may be a well known monostable multivibrator generating a reference pulse, having width commensurate with the external synchronizing pulses and outputs the reference pulses to the fluctuated pulse detector 56C. The detection circuit of the fluctuated pulse detector 56C may consist of a well known gate circuit or any other well known and readily available pulse width comparator ICs or microprocessors.

Fluctuation of a synchronizing signal may be obtained by reversing the polarity of pulse P1. A fluctuated pulse detector 56D of FIG. 7D is intended for detecting a reversed polarity pulse fed from the comparison circuit 52 of the TV camera through input terminal 55. The fluctuated pulse detector 56D comprises a level comparator having a reversed polarity reference voltage source 59D for outputting a fluctuated signal through output terminal 57 whenever the pulse fed through input terminal 55 has a reversed polarity.

To fluctuate the pulse polarity of the synchronizing signal generated by the external synchronizing generator 23 as described above in connection with FIG. 2 and FIG. 10D, the pulse timing and shaping circuit 21D may include buffer-inverter circuits 88 and 89 controlled by the fluctuation command signal generated by the fluctuating command circuit 32 for reversing the polarity of pulse P1.

The control circuit 70 shown in FIG. 8 comprises a coincidence circuit 74 for outputting ON or OFF signal to a video signal switch circuit 78 and a coincidence signal to a vertical sync "n" pulse counter 76. The vertical sync "n" pulse counter 76 outputs a switching signal to the video signal switch circuit 78 for switching on or off the composite video signal transmission of the corresponding transmitter 17.

In the switching apparatus of the present invention, it is preferable to synchronize the on or off timing of the video signal switch circuit 78 with the vertical synchronizing pulse of the external synchronizing signal. Depending on the method of fluctuating a signal used as described above, the timing of the switching may be obtained differently. For example, if the method of fluctuating the amplitude or polarity of external synchronizing pulse P1 is used, the switching timing can be synchronized with the first fluctuated synchronizing pulse because an accurate timing of the pulse remains the same along with the nonfluctuated signal. However, if the fluctuating method used is the removal of the external synchronizing pulse in a train or the widening or narrowing of the width of the external synchronizing pulse, it is preferable to synchronize the switching timing with the post-fluctuated external synchronizing pulses, since the timing of the fluctuated external synchronizing signal is undefined.

The input of the vertical sync "n" pulse counter 76 of the control circuit 70 (FIG. 8) is connected to receive the vertical synchronizing pulses generated by the internal synchronizing generator 53, for counting a predetermined number of vertical pulses after a coincidence signal is fed from the coincidence circuit 74.

The coincidence circuit 74 of control circuit 70 is fed with a fluctuated signal from the fluctuated pulse detector 56 through input terminal 57 (FIG. 4), while the input terminal 69 is connected to the code comparing circuit 67 which outputs a match or mismatch signal as described above.

When a match signal coincides with a fluctuation signal, the coincidence circuit 74 outputs ON signal to the video signal switch circuit 78 and a coincidence signal to the vertical sync "n" pulse counter 76 to enable the vertical sync "n" pulse counter 76 to count predetermined vertical pulses for outputting a switching signal to the video signal switch circuit 78 to the latter switch on.

A predetermined number of vertical sync pulses may be zero for synchronizing the switching time with the first fluctuated synchronizing pulse, or it can be set to any number such as 1, 2, 3, or n count which would be commensurate with the length of the fluctuating command signal generated by the fluctuating command circuit 32 and the timing of the identification code generation.

The input of the video switch circuit 78 (FIG. 4) is connected to the output of a video signal generating circuit 72 in transmitter 17 through a terminal 71. Therefore switching on of the video signal switch circuit 78 will connect the video composite signal to the transmission line 15 though the output terminal 16. The vertical sync "n" pulse counter 76 may be a well known preset digital counter, using readily available ICs. The coincidence circuit 74 may be a well known latching gate circuit using also readily available ICs. The video signal switch circuit 78 may be a well known relay or an electronic switch circuit using readily available ICs or discrete components thereof.

When a fluctuation signal is fed to the coincidence circuit 74 of the control circuit 70 through input terminal 57 and a mismatch signal outputted from the code comparing circuit 67 is fed through the input terminal 69 to the coincidence circuit 74, the coincidence circuit outputs OFF signal to the video signal switch circuit 74 and a coincidence signal to the vertical sync "n" pulse counter 76 to enable the vertical sync "n" pulse counter 76 to count predetermined vertical pulses for outputting a switching signal to the video signal switch circuit 78 to switch it off.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

I claim:

1. A method for synchronous remote switching of a plurality of transmitters in a television system including a plurality of transmitters for transmitting a composite video signal, each transmitter incorporating an individually allotted identification code, a receiver for receiving said composite video signal, and at least one transmission line for transmitting and receiving information between said transmitters and said receiver, the method comprising the steps of:

transmitting an external synchronizing signal from said receiver to said transmitters through said transmission line along with an identification code signal commensurate with the individually allotted identification code of a respective transmitter, wherein the external synchronizing signal is modified in said receiver so that a fluctuated external synchronizing signal is produced which is transmitted to said transmitters through said transmission line, and switching a respective one of said transmitters on to transmit said composite video signal to said receiver through said transmission line whenever said identification code signal is commensurate with a respective individually allotted identification code and after said external synchronizing signal has been modified.

2. A method according to claim 1, wherein said external synchronizing signal is modified by removing at least one pulse from a pulse train of the external synchronizing signals.

3. A method according to claim 1, wherein said external synchronizing signal is modified by widening or narrowing a pulse width thereof.

4. A method according to claim 1, wherein said external synchronizing signal is modified by increasing or decreasing a pulse amplitude thereof.

5. A method according to claim 1, wherein said external synchronizing signal is modified by reversing a pulse polarity thereof.

6. A method according to claim 1, wherein the time of switching on of any one of said transmitters to transmit said composite video signal to said receiver through said transmission line is synchronized with a first vertical synchronizing pulse subsequent to modifying of said external synchronizing signal.

7. A method according to claim 1, wherein the time of switching on of any one of said transmitters to transmit said composite video signal to said receiver through said transmission line is synchronized with a predetermined vertical synchronizing pulse subsequent to modifying of said external synchronizing signal.

8. A method according to claim 1, wherein the time of switching on of any one of said transmitters to transmit said composite video signal to said receiver through said transmission line is synchronized with a first modified vertical synchronizing pulse of said external synchronizing signal.

9. A method according to claim 1, wherein any one of said transmitters which transmits said composite video signal to said receiver through said transmission line will switch off and stop transmitting said composite video signal whenever said identification code signal is not commensurate with said respective allotted identification code, after said external synchronizing signal has been modified.

10. A method according to claim 8, wherein the time of switching on of any one of said transmitters to transmit said composite video signal to said receiver through said transmission line is synchronized with a first vertical synchronizing pulse subsequent to modifying of said external synchronizing signal.

11. A method according to claim 8, wherein the time of switching on of any one of said transmitters to transmit said composite video signal to said receiver through said transmission line is synchronized with a predetermined vertical synchronizing pulse subsequent to modifying of said external synchronizing signal.

12. A method according to claim 8 wherein the time any one of said transmitters switches off and stops transmitting said composite video signal to said receiver through said transmission line is synchronized with a first modified vertical synchronizing pulse of said external synchronizing signal.

13. A synchronous switching apparatus for a television system comprising a plurality of transmitters for transmitting a composite video signal, each transmitter incorporating an individually allotted identification code; a receiver for receiving said composite video signal; and at least one transmission line for transmitting and receiving information between said transmitters and said receiver, said receiver including a circuit for generating identification code signals commensurate with the individually allotted identification codes of respective transmitters and transmitting a respective identification code signal to said transmitters through said transmission line, a circuit for generating an external synchronizing signal, a circuit for transmitting said external synchronizing signal to said transmitters through said transmission line, and means for modifying the external synchronizing signal to produce a fluctuated signal transmitted to said transmitters through said transmitting line, each of said transmitters including a decoder means to decode said identification code signal, identification code comparison means to compare a decoded identification code signal with said individual allotted identification code and outputting a match signal or a mismatch signal, a sensor circuit for detecting a fluctuated external synchronizing signal and outputting said fluctuated signal, and a controller for switching on a composite video signal transmission whenever said match signal and said fluctuated signal are both inputted into said controller or for switching off the video signal transmission whenever said mismatch signal and said fluctuated signal are both inputted into said controller.

14. A synchronous switching apparatus according to claim 13, wherein said circuit for generating external synchronizing signals includes an external synchronizing signal generator connected to transmission lines adjacent to said receiver, for generating a synchronizing pulse signal having a voltage level higher than an maximal voltage level of said composite video signal transmitted by said transmitters or lower than a minimal voltage level of said composite video signal; and each transmitter including a level comparator circuit means for receiving said synchronizing pulse signal transmitted over the transmission line, comparing said received synchronizing pulse signal to a reference signal having a voltage level approximately equal to the voltage level of the synchronizing pulse signal, generating a comparison pulse signal when said voltage level of said received synchronizing pulse signal is equal to or higher than the voltage level of said reference signal, and applying said comparison pulse signal to a transmitter associated with said level comparator circuit means, for synchronizing said transmitters to said external synchronizing signal.

15. A synchronous switching apparatus according to claim 13, wherein said circuit for generating external synchronizing signals includes external synchronizing signal generating circuit means for generating external synchronizing signals selected from the group consisting of vertical synchronizing pulses only, vertical synchronizing and horizontal synchronizing pulses, and composite synchronizing pulses, for synchronizing said transmitters.

16. A synchronous switching apparatus according to claim 13, wherein said circuit for generating external synchronizing signals includes external synchronizing signal generating circuit means for generating external synchronizing signals consisting of a combination of vertical drive signals and horizontal drive signals, for driving synchronization circuits of said transmitters.

17. A synchronous switching apparatus according to claim 13, wherein said circuit for generating identification code signals generates said identification code signal during at least one desired horizontal scanning period of said composite video signal.

18. A synchronous switching apparatus according to claim 17, wherein said circuit for generating identification code signals includes a code setting circuit in which an identification code is set, a counter for counting a number of horizontal scanning lines of said composite video signal every field or frame of vertical scanning, and a circuit for generating said identification code signal corresponding to said identification code set in said code setting circuit when a counted value of the counter is a predetermined value.

19. A synchronous switching apparatus according to claim 18, wherein said identification code signal has at least two levels, a high level which is a white level and a low level which is a black level of a picture signal in the composite video signal.

20. A synchronous switching apparatus according to claim 13, wherein said decoder means includes a counter for counting a number of horizontal scanning lines of said composite video signal every field or frame of vertical scanning and for decoding said identification code signal when the counted value of the counter is a predetermined value.

21. A synchronous switching apparatus according to claim 13, wherein said means for modifying the external synchronizing signals is a gate circuit for removing, upon command, at least one pulse from an external synchronizing signal pulse train.

22. A synchronous switching apparatus according to claim 13, wherein said means for modifying the external synchronizing signals include a divider circuit for removing, upon command, every other pulse from an external synchronizing signal pulse train.

23. A synchronous switching apparatus, according to claim 13, wherein said means for modifying the external synchronizing signal includes a monostable circuit for generating, upon command, a wider or narrower width of the external synchronizing pulse.

24. A synchronous switching apparatus according to claim 13, wherein said means for modifying the external synchronizing signal is a buffer circuit to generate upon command, an increased or decreased amplitude of the external synchronizing pulse.

25. A synchronous switching apparatus according to claim 13, wherein said means for modifying the external synchronizing signal is an inverter/buffer circuit for reversing upon command, a polarity of the external synchronizing pulse.

26. A synchronous switching apparatus according to claim 13, wherein a switching time of said controller is synchronized with a first vertical synchronizing pulse subsequent to modifying said external synchronizing signal.

27. A synchronous switching apparatus according to claim 13, wherein a switching time of said controller is synchronized with a predetermined vertical synchronizing pulse subsequent to modifying of said external synchronizing signal.

28. A synchronous switching apparatus according to claim 13, wherein a switching time of said controller is synchronized with a first modified vertical synchronizing pulse of said external synchronizing signal.

* * * * *